July 15, 1958  P. C. TREXLER  2,842,773
JOINT FOR CONNECTING FLEXIBLE TUBULAR MEMBERS
Filed Dec. 23, 1955

INVENTOR.
PHILIP C. TREXLER
BY
Eugene C. Knoblock
ATTORNEY.

United States Patent Office 2,842,773
Patented July 15, 1958

2,842,773

JOINT FOR CONNECTING FLEXIBLE TUBULAR MEMBERS

Philip C. Trexler, Niles, Mich., assignor to Reyniers & Son, Chicago, Ill., a copartnership Application December 23, 1955, Serial No. 555,106

10 Claims. (Cl. 2—270)

This invention relates to a joint for connecting flexible tubular members.

The primary object of the invention is to provide a joint which effects a continuous sealed circumferential union between two flexible members and which is readily separable to accommodate replacement of one of the joined tubular members at will.

A further object is to provide a joint of this character defined by a rigid ring having a groove receiving lapped portions of the tubular members to be joined, and an elastic retainer firmly seating said lapped tubular parts in said groove and in turn restrained against expansion by a substantially inelastic member encircling said ring.

Other objects will be apparent from the following specification.

Figure 1:
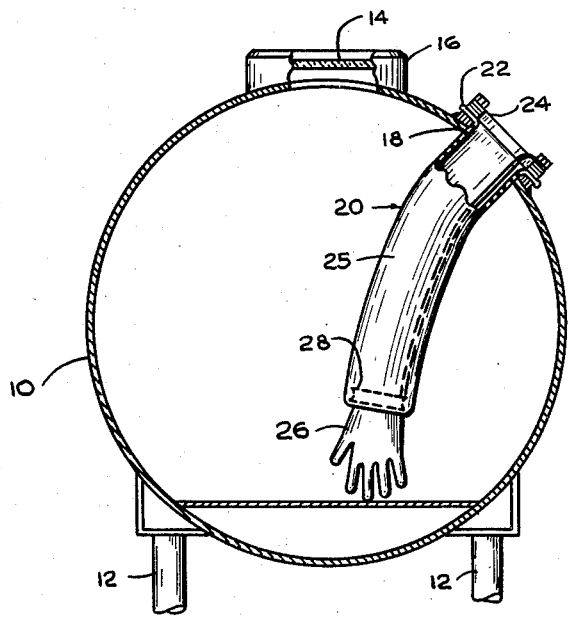
Fig. 1 is a view of a biological apparatus shown in cross-section to illustrate the manner of mounting a glove therein, which glove is made of two sections connected by my improved joint.

Referring to the drawing which illustrates one application and one embodiment of the invention, the numeral 10 designates a chamber, such as the chamber of a biological apparatus, which is mounted upon legs or other supports 12 and is provided with a sight opening spanned by a glass 14 mounted in a fitting 16. The container or chamber also has arm or access openings 18 through which pass gloves 20 which are anchored at their margins 22 by means of clamping rings 24. The gloves 20 are preferably formed of flexible material, such as rubber, synthetic rubber or synthetic resin material, so as to be flexible and accommodate manipulations by the user within the interior of the chamber 10. The gloves include a sleeve portion 25 and the hand receiving or mitt portion 26, the same being joined together by my new joint 28.

The joint 28 includes a ring 30 of substantially rigid material, such as aluminum or other metal, synthetic resin or the like, of a size to fit snugly within the tubular members to be joined, such as the sleeve 25 and the open or cuff portion 27 of a wrist length glove or mitten. The ring 30 has an outer circumferential groove 32 and is preferably of substantially U-shape in cross-section, with opposed portions 34 thereof rounded in cross-section as illustrated. An elastic ring 36, preferably of circular cross-section, and whose normal interior dimension is preferably less than the circumference of the groove 32 at its center, is adapted to seat in said groove 32 with a constrictive fit.

The tubular parts 25 and 26—27 to be joined are placed in lapped relation around the ring 30, and the elastic ring 36 is stretched and passed around the ring 30 and the tubular parts 25 and 26—27 and then is allowed to contract to press the tubular parts 25 and 26—27 into the groove and maintain them in full engagement continuously and circumferentially thereof and for a substantial longitudinal extent as determined by the transverse dimensions of the groove 32 of the ring. A substantially inelastic member 38 is then mounted around the elastic ring 36 to retain the elastic ring 36 in the groove and prevent expansion or stretching thereof. The member 38 may be an adhesive tape having a fabric or substantially inelastic back which is detachably adhered to the elastic band 36 and the adjacent sleeve part 20, or member 38, may be a metal ring or band.

Figure 2:
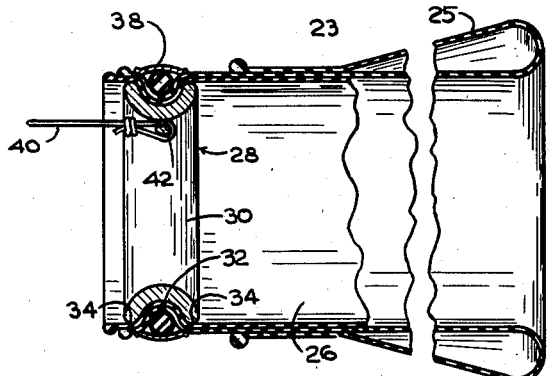
Fig. 2 is a fragmentary enlarged view illustrating the manner of assembling the joint.
Figure 3:
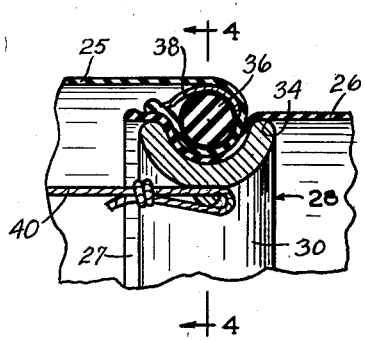
Fig. 3 is an enlarged fragmentary sectional detail view taken on line 3—3 of Fig. 4, and illustrating the joint construction in its finished condition.
Figure 4:
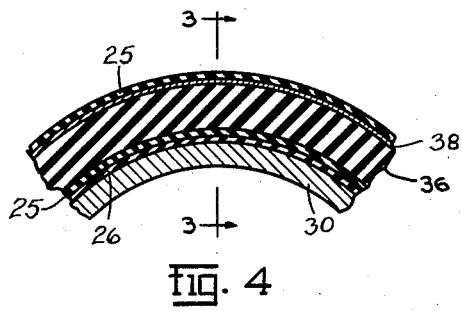
Fig. 4 is a fragmentary sectional view taken on line 4—4 of Fig. 3.

In the assembly of the joint, assuming that the parts to be connected consist of the sleeve 25 and the wrist length glove 26—27, the ring 30 is first introduced into the open end of one of the members to be connected, for example, the open end of the cuff 27 of the glove 26 as seen in Fig. 2. Thereupon, the other tubular member, such as the sleeve 25, has a portion thereof reversed, as at 23, and fitted around the end portion of the member 28 and the ring 30 so that the two thicknesses of the tubular members to be connected extend around the ring 30. Thereupon, the elastic or expansible ring 38 is stretched and inserted through the member 25 and passed around the ring 30 and the lapped parts of the members 23 and 27 extending around the ring and, when the same has been positioned in register with the groove 32 of the ring 30, the elastic ring is released and permitted to seat in the groove to force the lapped tubular parts 23 and 27 into the groove 32 of the ring 30. This insures a continuous sealing frictional engagement of the inner tubular member 27 with the ring 30 circumferentially thereof and for a substantial extent along the length thereof as determined by the transverse dimension of the circumference of the groove 32 engaged by the member 27. The same also provides for a continuous contact through substantially the same area of the members 23 and 27 with one another, and provides for substantially the same area of contact between the ring 36 and the outer tubular part 23. Thereupon the nonelastic retainer 38 is applied over the elastic ring 36 as by passing an adhesive tape therearound and adhering the same to the ring 36 and the adjacent sleeve portion 21 or by passing a rigid metal ring around the elastic ring 36. The tubular members may be extended endwise to the position shown in Fig. 3 in which it will be seen that the device provides a neat joint at the exterior of the tubular members and a substantially rigid joint ring.

It will be understood, however, that reverse folding of one tubular member, as at 23, is not essential. Instead, the tubular members may have a simple lapped joint, with the rings 30 and 36 passed full length of one tube to the joint to effect the same interlock of parts as described above.

By this construction it is possible to attach tubular flexible members easily in a manner to accommodate ready detachment and yet to effect and maintain a sealed joint between such connected members as long as desired. One important use for such a joint is to provide a long sleeve length glove 20 from a separate wrist length rubber or plastic glove 26 and an arm length sleeve 25. Long sleeved gloves are used frequently in biological apparatus, sterile hoods, and as parts of diving suits, protective garments, and contamination control equipment. In such instances it has been necessary heretofore to employ one-piece or cemented gloves only. Such long sleeved gloves available heretofore have been limited as to size and weight, and usually are inferior in quality to mass produced rubber or plastic gloves of the wrist length type. It will be understood also that the present device makes possible the sealed attachment of separate wrist length gloves to diving suits or contamination resistant worker sheaths. Many other uses are also available, the only limitation being that the tubular members to be connected shall have substantially similar transverse or cross-sectional or circumferential dimensions, so that they may fit snugly within each other and about ring 30 without requiring any substantial laps or folds which would interfere with continuous sealing face engagement with each other when seated within the groove 32 of the ring by the constriction of the elastic ring 36.

In instances where it is desired to relieve the material of the sleeve 20 from the stresses involved in directly sustaining the weight of the ring and the connected glove part 26, as for example in a garment sheath, it is possible to apply a tape or band 40 to serve this function. This tape or band 40 may be connected to the garment or to the mounting of the sleeve member 20 at a point remote from the joint 28, and may be attached at 42 to the ring 30, as illustrated in Fig. 2. An arrangement of this character is also illustrated in Fig. 1 from which it will be seen that the pull of the joint 28 is transmitted by the tape 40 to the housing 10 and the clamping ring 24, thus relieving the flexible sleeve 20 from the sustaining of the weight of the glove and the ring.

While the preferred embodiment of the invention has been illustrated and described, it will be understood that changes in the construction may be made within the scope of the appended claims without departing from the spirit of the invention.

I claim:

1. In combination, a pair of flexible tubular members arranged in circumferentially lapped relation, a rigid ring encircled by the lapped portions of said members and having an outer circumferential groove, an elastic ring constrictively encircling said first ring and confining said lapped portions in said groove, and a substantially inelastic ring encircling said elastic ring.

2. In combination, a pair of flexible tubular members arranged in circumferentially lapped relation, a rigid ring encircled by the lapped portions of said members and having an outer circumferential groove, an elastic ring constrictively encircling said first ring and confining said lapped portions in said groove, and a substantially inelastic tape encircling and adhered to said elastic ring.

3. In combination, a pair of flexible tubular members arranged in circumferentially lapped relation, a rigid ring encircled by the lapped portions of said members and having an outer circumferential groove, an elastic ring constrictively encircling said first ring and confining said lapped portions in said groove, and a metal ring having a snug encircling fit on said elastic ring.

4. In combination, a pair of flexible tubular members arranged in circumferentially lapped relation, a rigid ring encircled by the lapped portions of said members and having an outer circumferential groove, an elastic ring constrictively encircling said first ring and confining said lapped portions in said groove, and a flexible substantially inelastic strand extending through one member and secured to said first ring.

5. In combination, a pair of flexible tubular members arranged in circumferentially lapped relation, a rigid ring encircled by the lapped portions of said members and having an outer circumferential groove, an elastic ring constrictively encircling said first ring and confining said lapped portions in said groove, and a substantially inelastic ring encircling said elastic ring, the outermost tubular member being infolded at its lapped end whereby said member encircles said rings.

6. A joint comprising a pair of flexible tubular members, an endless rigid member of U-shaped cross-sectional shape defining an endless groove receiving said end portions of said members in lapped relation, a flexible elastic endless member anchoring said lapped portions in said groove in circumferentially continuous frictional engagement, and a retainer locking said anchoring member in said groove.

7. A glove comprising an elongated tubular flexible sleeve portion, a flexible glove portion, the end margins of said portions interfitting, a rigid exteriorly grooved endless member encircled by said interfitting margins, an elastic member encircling and pressing said margins into said groove and into continuous circumferential engagement, and a retainer detachably anchoring said elastic member in said groove.

8. A glove comprising an elongated tubular flexible sleeve portion, a flexible glove portion, the end margins of said portions interfitting, a rigid exteriorly grooved endless member encircled by said interfitting margins, an elastic member encircling and pressing said margins into said groove and into continuous circumferential engagement, and a non-extensible member encircling said elastic member to retain the same in said groove.

9. A glove comprising an elongated tubular flexible sleeve portion, a flexible glove portion, the end margins of said portions interfitting, a rigid exteriorly grooved endless member encircled by said interfitting margins, an elastic member encircling and pressing said margins into said groove and into continuous circumferential engagement, a retainer detachably anchoring said elastic member in said groove, and a flexible strand extending through said sleeve portion and secured to said endless member.

10. A glove comprising an elongated tubular flexible sleeve portion, a flexible glove portion, the end margins of said portions interfitting, a rigid exteriorly grooved endless member encircled by said interfitting margins, an elastic member encircling and pressing said margins into said groove and into continuous circumferential sealing engagement, said groove being of a depth to substantially completely receive and confine said elastic member, and an endless inelastic retainer encircling said elastic member and spanning said groove.

References Cited in the file of this patent

UNITED STATES PATENTS

| 980,355 | Spencer | Jan. 3, 1911 |
| 2,007,518 | Calhoun | July 9, 1935 |
| 2,655,663 | Hoagland | Oct. 30, 1953 |

FOREIGN PATENTS

| 537,083 | Great Britain | June 9, 1941 |